No. 682,572. Patented Sept. 10, 1901.
L. M. SCHLARB.
PROCESS OF CURING MEATS.
(Application filed June 3, 1901.)
(No Model.) 2 Sheets—Sheet I.
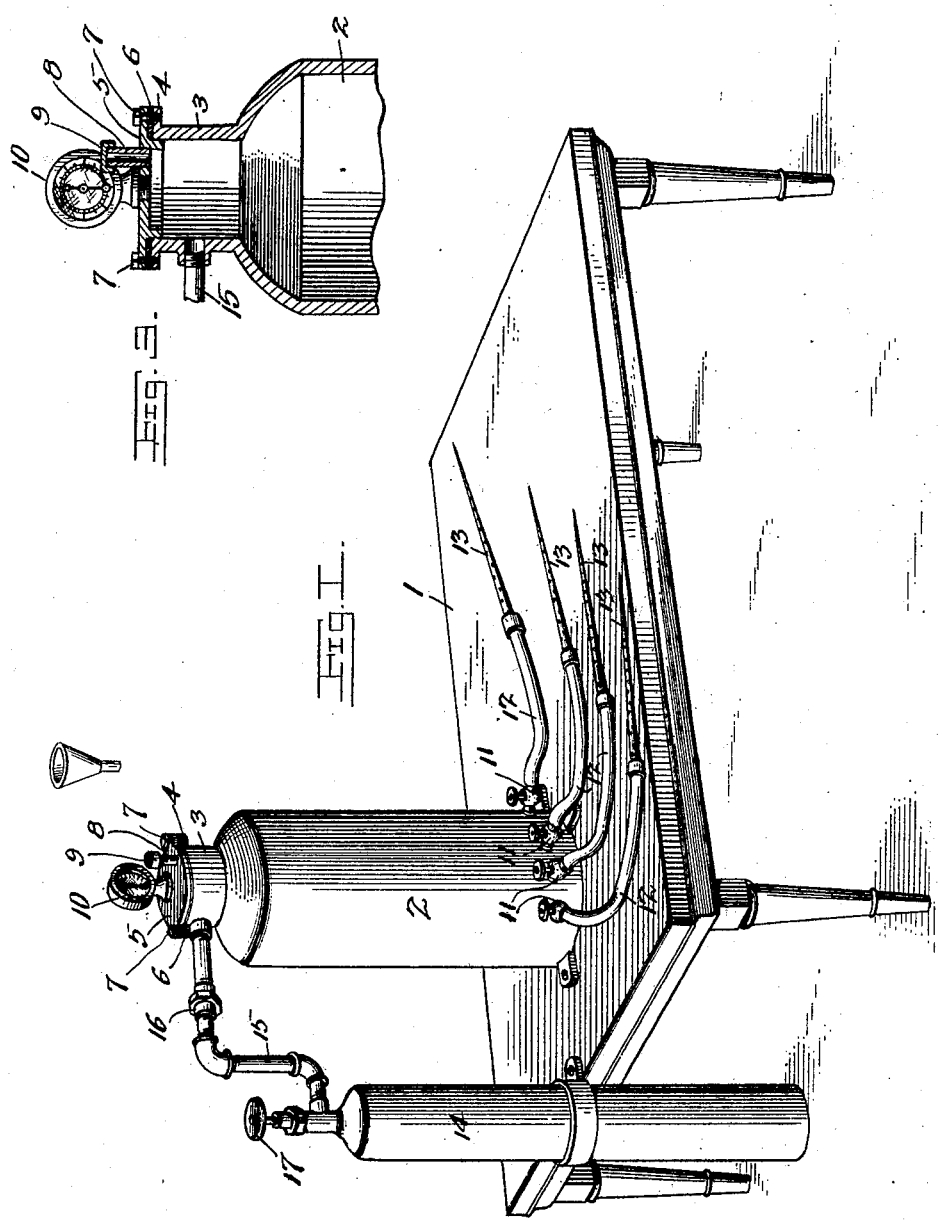
Witnesses
L. M. Schlarb, Inventor.
by C. A. Snow & Co.
Attorneys No. 682,572. Patented Sept. 10, 1901.
L. M. SCHLARB.
PROCESS OF CURING MEATS.
(Application filed June 3, 1901.)
(No Model.) 2 Sheets—Sheet 2.
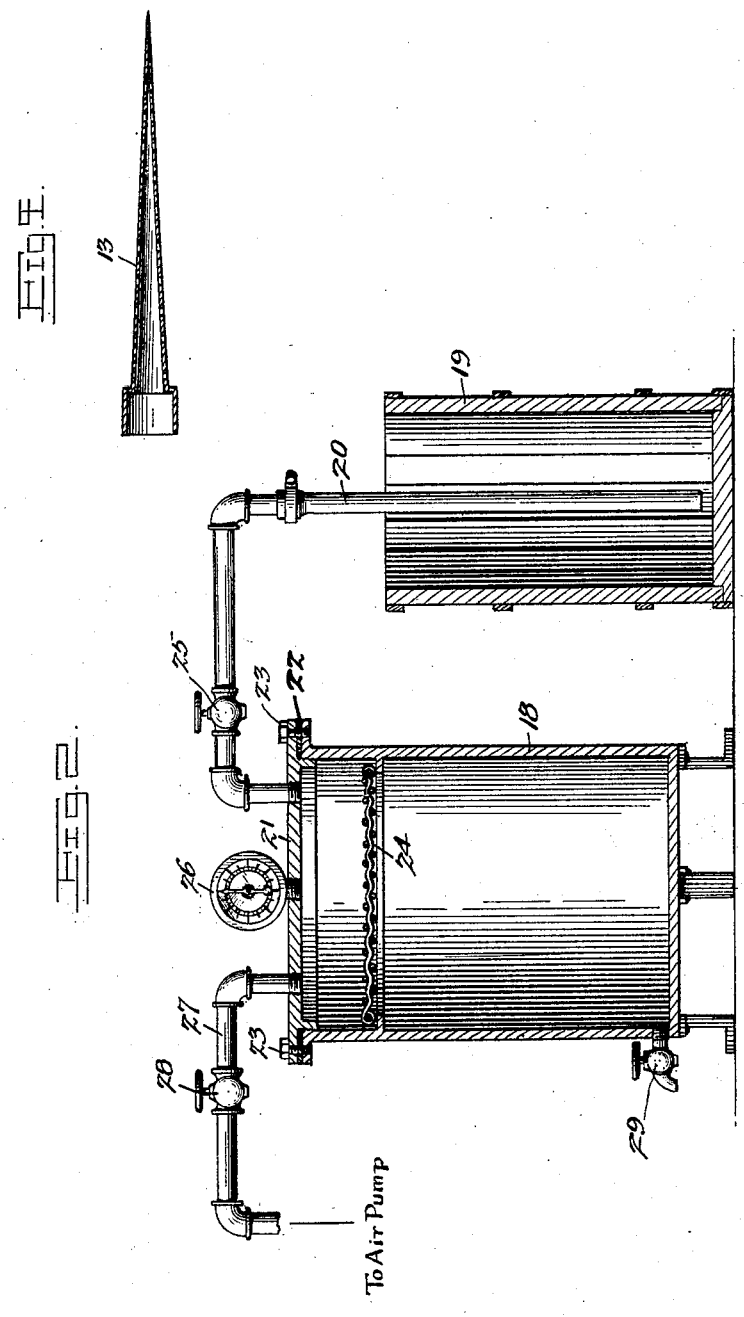
Witnesses
F. E. Alden
J. W. Garner
L. M. Schlarb, Inventor.
by C. A. Snow & Co.
Attorneys

UNITED STATES PATENT OFFICE.

LOUIS M. SCHLARB, OF ALLEGHENY, PENNSYLVANIA, ASSIGNOR TO THE B. GLOEKLER COMPANY, OF PITTSBURG, PENNSYLVANIA.

PROCESS OF CURING MEATS.

SPECIFICATION forming part of Letters Patent No. 682,572, dated September 10, 1901.

Application filed June 3, 1901. Serial No. 62,957. (No specimens.)

*To all whom it may concern:*

Be it known that I, LOUIS M. SCHLARB, a citizen of the United States, residing at Allegheny, in the county of Allegheny and State of Pennsylvania, have invented a new and useful Process of Curing Ham, Bacon, and other Meat, of which the following is a specification.

My invention is an improved process for curing ham, bacon, and other kinds of meat, as is hereinafter fully set forth, and particularly pointed out in the claims.

In the accompanying drawings, Figure 1 is a perspective view of an apparatus for initially treating the meat by injecting brine and carbonic acid thereinto. Fig. 2 is a sectional view of an apparatus for finally treating the meat. Fig. 3 is a detail sectional view of the tank shown in Fig. 1. Fig. 4 is a detail sectional view of one of the needle-nozzles.

I will first describe the apparatus which I employ in carrying out my improved meat-curing process. On a suitable table 1 is secured a tank 2, which is generally of the capacity of ten gallons or more. The said tank has a neck 3, provided with a flange 4. A cap 5 is adapted to close the neck of the tank 2 and, as here shown, a packing 6 is employed to effect a tight joint between the tank and the cap, and suitable bolts 7 are also employed to firmly secure the cap on the neck of the tank. The cap is provided with a suitable inlet 8, having a closure 9, and is also provided with a pressure-gage 10. At the bottom of the tank 2, on one side thereof, are a series of cocks 11, to each of which is attached a flexible tube 12. At the outer end of each of the said flexible tubes is an injecting needle-nozzle 13, which is adapted to be inserted in a ham, piece of bacon, or other piece of meat. A reservoir 14 for carbonic acid is connected to the neck of the tank 2 by a pipe 15, having a suitable coupling 16 and a suitable cock 17. Thereby communication between the acid-reservoir and the tank may be established or cut off at will.

In connection with the apparatus hereinbefore described I also employ a tank 18 and a reservoir 19 for brine. The latter is connected to the tank 18 through a pipe 20, which leads from a point near the bottom of the reservoir 19 to an opening in the cover 21 of tank 18. Said cover 21 is adapted to be removed from said tank 18 at will. I provide a suitable packing 22 to effect a tight joint between said cover 21 and said tank 18, and also employ suitable devices 23, here shown as bolts, to firmly secure said cover on said tank. A grating 24 is located in the tank 18, near the top of the same, and is adapted to to be removed therefrom at will. The pipe 20 has a cock 25, by means of which communication between the reservoir 19 and tank 18 may be established or cut off at will. The cover 21 is provided with a pressure-gage 26. A pipe 27 leads from the said cover to an air-pump (not shown) and is provided with a valve 28. The tank 18 is provided with a faucet 29, by which it may be drained of its contents.

In carrying out my improved process for curing meat the tank 2 and reservoir 19 are first filled with brine, and the reservoir 14 is charged with carbonic acid. The valve 17 is then opened to establish communication between the reservoir 14 and said tank 2, thereby causing the brine in said tank to be subjected to the pressure of the carbonic acid. When the brine in tank 2 is under the pressure of about two atmospheres, the meat to be cured is placed on the table 1 and one or more of the needle-nozzles inserted therein, according to the size of the piece of meat, and by opening the valves 11 the brine is forced by the pressure of the carbonic acid into the meat, together with some of the carbonic-acid gas, as will be understood. In practice the needle-nozzles are permitted to remain in the meat about one minute, which suffices to thoroughly inject brine and carbonic acid into the meat. The carbonic acid, as is well known, is a preservative of great value and by being thus injected, together with the brine, into the meat increases the efficiency of the brine as a preservative. The pressure of the carbonic acid on the brine in the tank 2 is uniform, and by means of the gage 10 and valve 17 the brine may be injected at any desired pressure in the meat. As soon as enough meat to fill the tank 18 has been thus injected with brine and carbonic acid the meat is placed in the said tank 18 under the grating 24. The top 21 is then secured on said tank 18, the valve 25 closed, together with the spigot 29, and the valve 28 is opened and the air-pump put in operation and caused to exhaust the air from the tank 18, which contains the meat, and to create a vacuum therein. By this means all of the air contained in the meat is exhausted therefrom. The valve 28 is then closed and the valve 25 opened, whereupon the vacuum in the tank 18 causes brine to be drawn from the reservoir 19 into said tank. Owing to the vacuum the brine is driven with great force into the tank and into the meat, as will be understood, and fills all the cavities in the meat which were formerly occupied by air. The meat is permitted to remain in the brine in the tank 18 for a period of about ten hours, which is sufficient to thoroughly cure the meat. After having thus been cured the meat may be used and may be smoked or the smoking omitted, as may be desired.

Under certain conditions, as where the meat is to be exported, the meat after having been subjected to the action of the brine in the tank 18 for about ten hours may be finally subjected to the action of carbonic acid under pressure. This may be done in the tank 18 by first drawing the brine therefrom and then connecting the carbonic-acid reservoir to the said tank 18, as will be readily understood.

Having thus described my invention, I claim—

1. The herein-described process of curing meat, consisting in injecting brine and carbonic acid therein, under pressure, exhausting the air from the meat and subsequently subjecting the meat to the action of brine *in vacuo*.

2. The herein-described process of curing meat, consisting in simultaneously injecting brine and carbonic acid therein under pressure, exhausting the internal air from the meat, subjecting the meat to the action of brine *in vacuo* and finally subjecting the meat to the action of carbonic acid under pressure.

3. The herein-described process of curing meat consisting in injecting a preservative fluid and carbonic acid therein, exhausting the internal air from the meat and subsequently subjecting the meat while *in vacuo*, to the action of preservative fluid.

4. The herein-described process of curing meat consisting in injecting brine and carbonic acid therein exhausting internal air therefrom and subjecting the meat while *in vacuo* to the action of a preservative.

In testimony that I claim the foregoing as my own I have hereto affixed my signature in the presence of two witnesses.

LOUIS M. SCHLARB.

Witnesses:
C. S. EDEBURN,
W. MCKELVEY.